United States Patent
Yamazaki

(10) Patent No.: US 8,970,005 B2
(45) Date of Patent: Mar. 3, 2015

(54) MEMS ELEMENT

(71) Applicant: Kabushiki Kaisha Toshiba, Minato-ku, Tokyo (JP)

(72) Inventor: Hiroaki Yamazaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1 day.

(21) Appl. No.: 14/021,762

(22) Filed: Sep. 9, 2013

(65) Prior Publication Data

US 2014/0284767 A1  Sep. 25, 2014

(30) Foreign Application Priority Data

Mar. 25, 2013  (JP) .................................. 2013-062670

(51) Int. Cl.
*H01G 5/18*  (2006.01)

(52) U.S. Cl.
CPC ........................................ *H01G 5/18* (2013.01)
USPC ............................ 257/600; 257/415; 257/595

(58) Field of Classification Search
USPC .......................................... 257/415, 595, 600
See application file for complete search history.

(56) References Cited

U.S. PATENT DOCUMENTS

| 2005/0146241 | A1* | 7/2005 | Wan ............................... | 310/309 |
| 2006/0056132 | A1 | 3/2006 | Yoshida et al. | |
| 2012/0319528 | A1* | 12/2012 | Jahnes et al. .................. | 310/300 |
| 2014/0211366 | A1* | 7/2014 | Morris et al. ................. | 361/277 |

FOREIGN PATENT DOCUMENTS

| JP | 2010-067587 A | 3/2010 |
| JP | 2011-011325 A | 1/2011 |
| JP | 2011-023468 A | 2/2011 |
| JP | 2012-178379 A | 9/2012 |

* cited by examiner

*Primary Examiner* — Matthew W Such
*Assistant Examiner* — David Spalla
(74) *Attorney, Agent, or Firm* — Holtz, Holtz, Goodman & Chick PC

(57) ABSTRACT

According to one embodiment, there is disclosed a MEMS element. The MEMS element includes a lower electrode having a surface on which a plurality of minute convex portions are formed. A plurality of dielectric bumps are provided on the upper surface of the lower electrode and are thicker than heights of the convex portions. A dielectric layer is provided on the dielectric bumps and the lower electrode. An upper electrode is provided above the dielectric layer. The upper electrode is movable so as to vary capacitance between the upper electrode and the lower electrode.

18 Claims, 8 Drawing Sheets

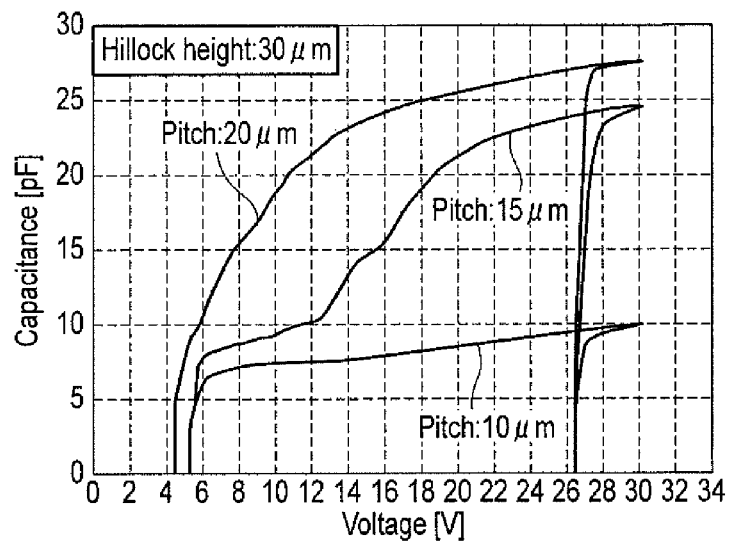
F I G. 3A
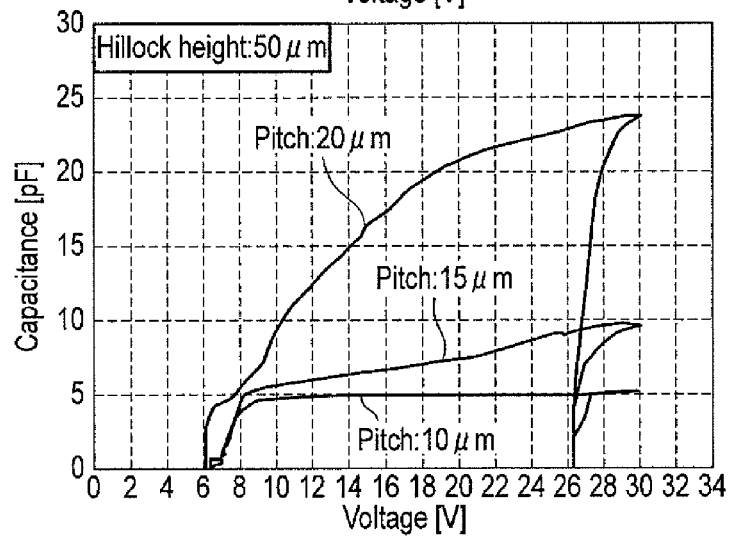
F I G. 3B
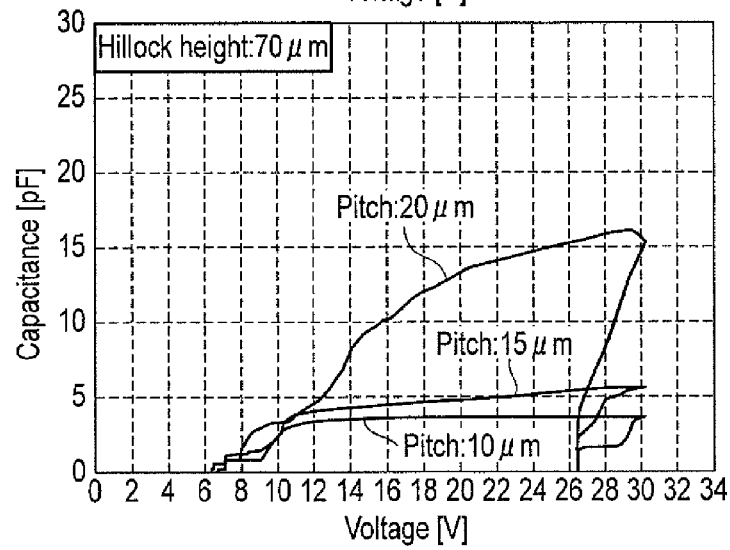
F I G. 3C

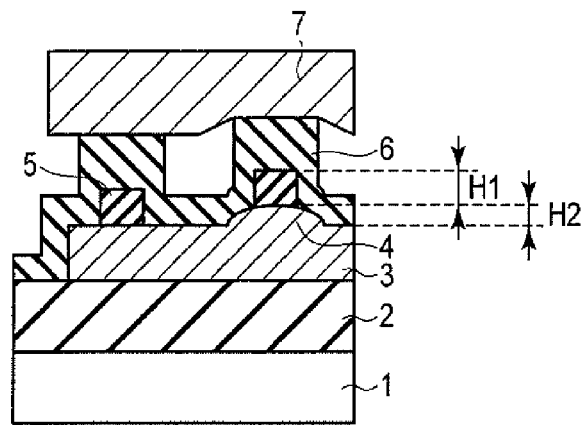
F I G. 6
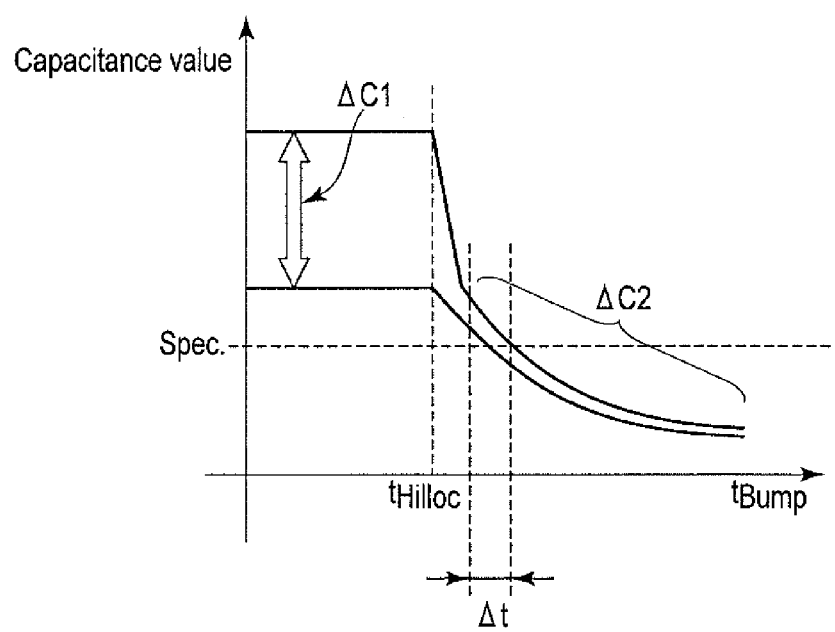
F I G. 7

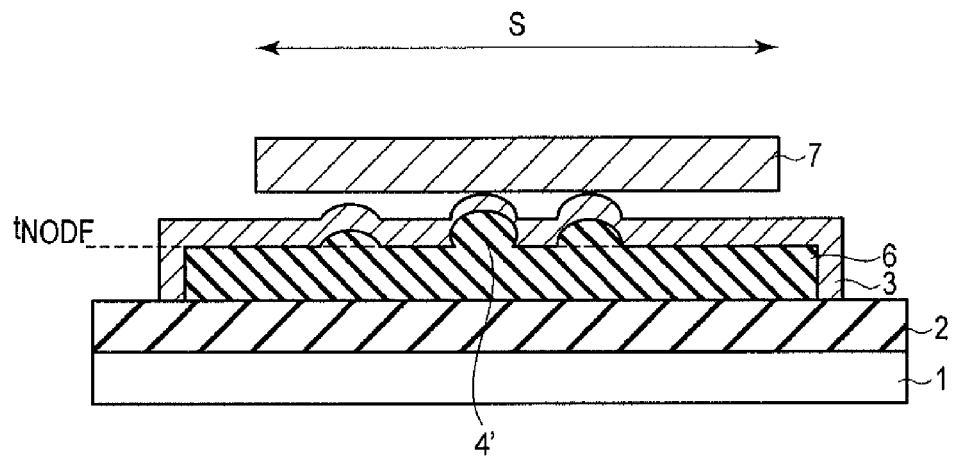
F I G. 8
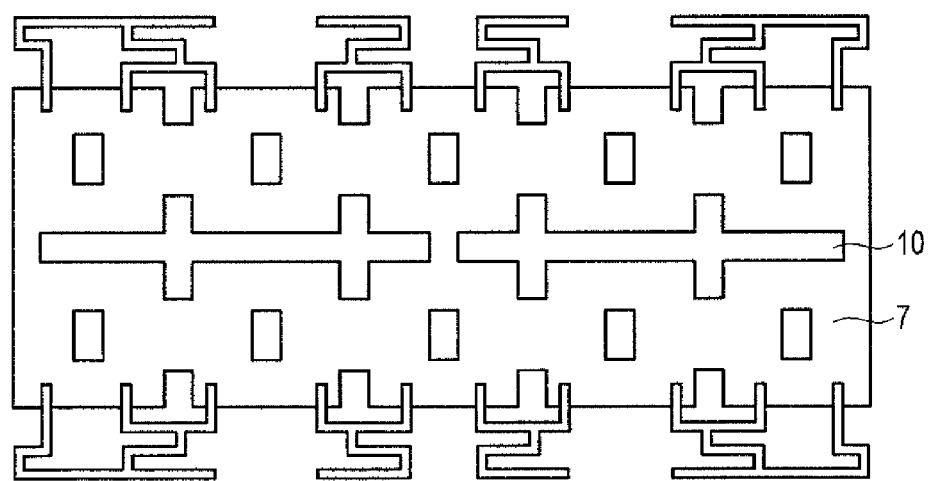
F I G. 9

MEMS ELEMENT

CROSS-REFERENCE TO RELATED APPLICATIONS

This application is based upon and claims the benefit of priority from Japanese Patent Application No. 2013-062670, filed Mar. 25, 2013, the entire contents of which are incorporated herein by reference.

FIELD

Embodiments described herein relate generally to a MEMS (Micro Electro Mechanical Systems) device.

BACKGROUND

A MEMS element comprises a movable portion. When the MEMS is applied to a variable capacitance element, an upper electrode is a variable electrode, and a lower electrode is a fixed electrode. It is possible to vary capacitance by varying a gap between the upper electrode and the lower electrode by static electricity generated between the lower electrode and the upper electrode. In this type of MEMS element (variable capacitance element Z), variation of capacitance should desirably be suppressed to a low level.

BRIEF DESCRIPTION OF THE DRAWINGS

FIGS. 3A, 3B, and 3C illustrate results of an examination of effect of heights and pitches of hillocks on CV characteristics of a capacitor in a comparative example;

FIG. 6 is a cross-sectional view schematically showing a MEMS element according to an embodiment;

FIG. 7 illustrates a result of examination of a relationship between heights of bumps and variation of capacitance;

FIG. 8 is a cross-sectional view schematically illustrating a MEMS element of the comparative example in a down state;

FIG. 9 is a plane view illustrating a pattern of an upper electrode of an embodiment;

DETAILED DESCRIPTION

Embodiments will now be described with reference to the accompanying drawings.

According to an aspect, there is provided a MEMS element. The MEMS element includes a lower electrode having an upper surface on which a plurality of minute convex portions are formed. A plurality of dielectric bumps are provided on the upper surface of the lower electrode and are thicker than heights of the convex portions. A dielectric layer is provided on the dielectric bumps and the lower electrode. An upper electrode is provided above the dielectric layer and configured to be movable so as to vary capacitance between the upper electrode and the lower electrode (First Embodiment)

Figure 1:
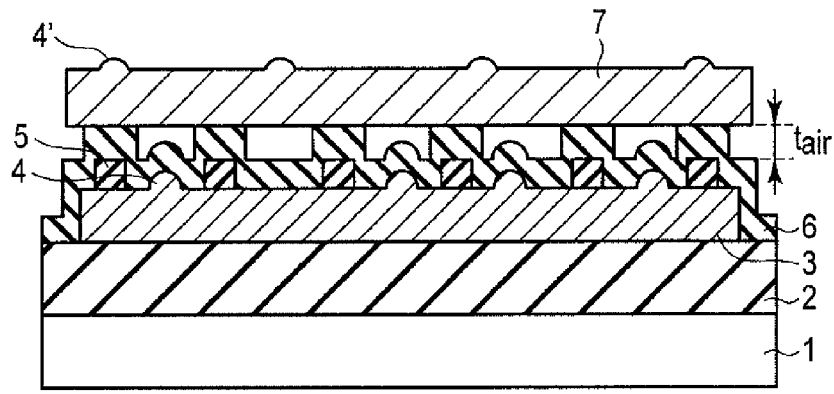
FIG. 1 schematically shows a pattern forming apparatus according to an embodiment.

FIG. 1 is a cross-sectional view schematically showing a MEMS element according to an embodiment. In the present embodiment, MEMS is applied to a variable capacitance element.

In the drawing, the reference numeral 1 designates a silicon substrate (semiconductor substrate), and a silicon oxide film (insulating film) 2 is provided on the semiconductor substrate 1.

A lower electrode (fixed electrode) 3 of the variable capacitance element is provided on the silicon oxide film 2. The material of the lower electrode 3 is, for example, Al or AlCu. Since the lower electrode 3 is generally formed by deposition of metal, hillocks (minute protrusions containing the material of the lower electrode 3) 4 exist on a surface of the lower electrode 3. The hillocks 4 have a height of tens of nm or less, for example.

A plurality of dielectric bumps 5 are provided on the lower electrode 3. The dielectric bumps 5 have a height greater than that of the hillocks 4. The material of the dielectric bumps 5 is, for example, a silicon oxide. FIG. 1 shows an example in which the hillocks 4 exist between the dielectric bumps 5. The dielectric bumps 5 can be formed, for example, by forming a dielectric layer on a region including the lower electrode 3, forming a resist pattern on the dielectric layer, and etching the silicon oxide film using the resist pattern as a mask.

A dielectric layer 6 of the variable capacitance element is provided on the silicon oxide film 2, the lower electrode 3, the hillocks 4, and the dielectric bumps 5.

The dielectric layer 6 and the dielectric bumps 5 may be formed of different types of insulating materials, or the same type of insulating material. Since the dielectric layer 6 is used as a dielectric of capacitance, the dielectric layer 6 should preferably have a high permittivity. The dielectric bumps 5, which similarly function as a dielectric, do not necessarily need to have a high permittivity as with the dielectric layer 6, since an occupation area of the dielectric bumps is sufficiently less than that of the dielectric layer 6 and causes little effect on the capacitance. Since the dielectric bumps 5 are formed by processing the dielectric layer, the dielectric bumps 5 should preferably be made of a material that is easy to process. From these points of view, the dielectric layer 6 and the dielectric bump 5 should preferably be formed of different types of insulating materials, and the material of the dielectric layer 6 is a silicon nitride, and the material of the dielectric bumps 5 is a silicon oxide, for example.

An upper electrode (variable electrode) 7 of the variable capacitance element is provided on the lower electrode 3 via the dielectric layer 6. In generally, hillocks 4' exist on an upper surface of the upper electrode 7. This is because the upper electrode 7 is typically formed by deposition of metal. In this case, hillocks are rarely generated on a lower surface of the upper electrode 7.

In the present embodiment, since the dielectric bumps 5 are higher the hillocks 4, a distance $t_{air}$ between the dielectric layer 6 and the upper electrode 7 does not depend on a height of the hillocks 4 (hillock height) but on a height of the dielectric bumps 5 (bump height). Since the bump height can be easily controlled by semiconductor process, variation in distance $t_{air}$ decreases, which enables a device characteristics to be suppressed from being deteriorated.

Figure 2:
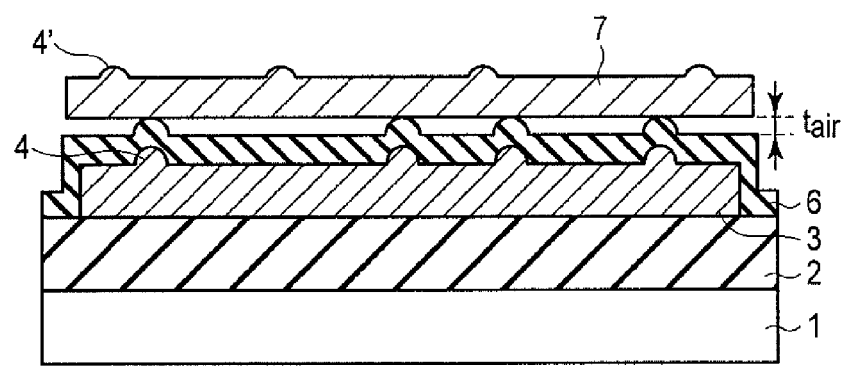
FIG. 2 is a cross-sectional view schematically showing a MEMS element of a comparative example.

FIG. 2 is a cross-sectional view schematically showing a HEMS element of a comparative example. The HEMS element of the comparative example has a structure in which the dielectric bumps 5 are omitted from the HEMS element of the embodiment.

In the case of the comparative example, the distance $t_{air}$ depends on the hillock height. Since the height of the hillocks 4 is difficult to control, it is difficult to suppress deterioration of the device characteristics caused by the variation in distance $t_{air}$.

FIGS. 3A-3C illustrate results of an examination of effect of the hillock height and the hillock pitch on the CV characteristics of a capacitor in the comparative example. Specifically, FIGS. 3A-3C illustrate CV characteristics of when the hillock heights are 30 nm, 50 nm and 70 nm, and the hillock pitches are 10 μm, 15 μm, and 20 μm, respectively.

Figure 4:
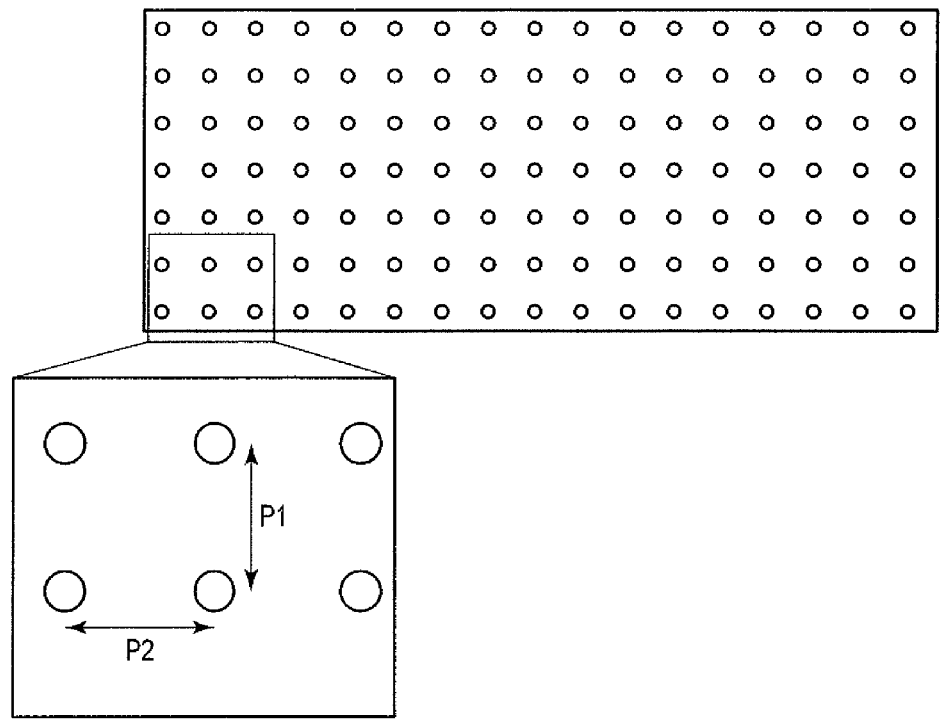
FIG. 4 is a plane view illustrating hillocks.

Here, as shown in FIG. 4, the hillocks 4 are arranged in a matrix pattern, and a hillock pitch P1 in a longitudinal direction and a hillock pitch P2 in a lateral direction are equal (P1=P2).

FIGS. 3A-3C show that, in the comparative example, the capacitance greatly fluctuates according to variation in hillock pitches (10-20 μm), regardless of the hillock height.

In the present embodiment, the hillock pitch of the comparative example corresponds to a pitch of the dielectric bumps 5. Since the pitch of the dielectric bumps 5 can be controlled by semiconductor process, the capacitance does not greatly fluctuate.

Figure 5:
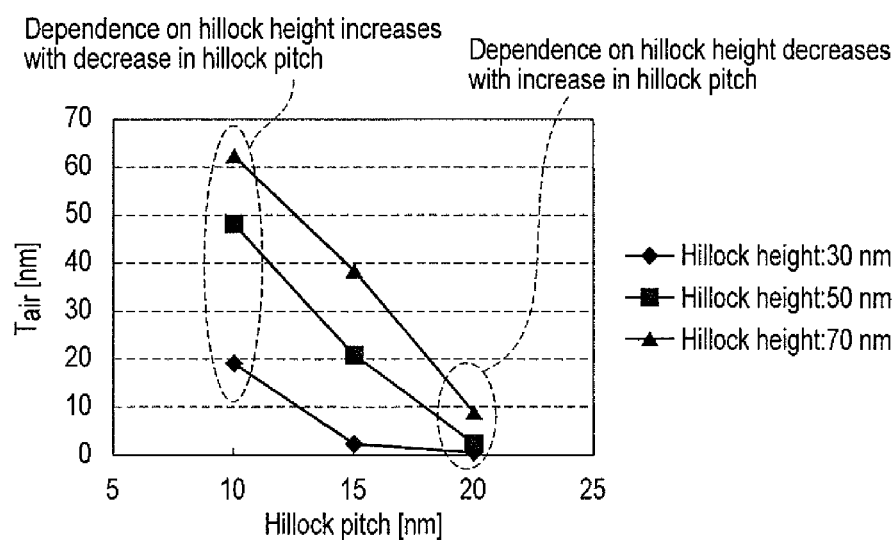
FIG. 5 illustrates a result of examination of a relationship among heights of hillocks, pitches of hillocks, and a distance $t_{air}$ in a comparative example.

FIG. 5 shows a result of examination of a relationship among the hillock height, the hillock pitch, and the distance $t_{air}$ in the comparative example.

FIG. 5 shows that, in the comparative example, dependence of the distance $t_{air}$ on the hillock height increases as the hillock pitch decreases.

In the present embodiment, the bump height corresponds to the hillock height of the comparative example. The bump height can be controlled by semiconductor process, and dependence of the distance $t_{air}$ on the hillock height caused by the hillock pitch is small.

Here, there is a possibility that the dielectric bump 5 may be formed on the hillock 4, as shown in FIG. 6, but the dependence of the distance $t_{air}$ on the hillock height caused by the hillock pitch is small, since the hillocks 4 are more likely to be formed between the dielectric bumps 5. The MEMS element shown in FIG. 6 is also within the scope of the present embodiment.

FIG. 7 shows a result of examination of a relationship between the bump height ($t_{Bump}$) and variation of capacitance (C).

In FIG. 7, $t_{Hillock}$ represents an average value of the hillock height, and Spec. represents a specification value of C.

If $t_{Bump} < t_{Hillock}$, the variation of capacitance (ΔC1) is dominated by the hillock height (conventional technique).

If $t_{Bump} \leq t_{Hillock}$, the variation of capacitance (ΔC2) is dominated by the bump height, and the values of ΔC2 and C generally decrease as the value of $t_{Bump}$ increases. By setting the bump height within a certain range Δt, it is possible to satisfy the condition C≥Spec. and to suppress the variation of capacitance to a certain level or lower.

FIG. 8 is a cross-sectional view schematically showing a MEMS element of a comparative example in which an upper electrode is positioned in a vicinity of the lower electrode (down state situation). The capacitance of the MEMS element of the comparative example shown in FIG. 8 is given by the following formula (1):

$$C_{down} \approx \in_0 S/t_{eff} \tag{1}$$

where $\in_0$ represents a permittivity of vacuum, S represents an electrodes area (a facing area between the lower electrode 3 and the upper electrode 7), and $t_{eff}$ represents an effective film thickness in a case where all the dielectric between the lower electrode 3 and the upper electrode 7 is an air layer. The effective film thickness $t_{eff}$ is given by the following formula (2):

$$t_{eff} = t_{Hillock} + t_{NODF}/\in_{NODF} \tag{2}$$

where $t_{Hillock}$ represents a height of a convex portion (convex portion generated by a hillock of foundation) of the dielectric layer 6, $t_{NODF}$ represents a thickness of the dielectric layer 6, and $\in_{NODF}$ represents a relative permittivity of the dielectric layer 6.

The $t_{Hillock}$ corresponds to the distance $t_{air}$ between the dielectric layer 6 and the upper electrode 7 of the comparative example shown in FIG. 2.

On the other hand, the capacitance of when the MEMS element of the embodiment shown in FIG. 1 is in a down state is given by the following formula (3):

$$C_{down} \approx (1-\alpha)\in_0 S/(t_{Bump} + t_{NODF}/\in_{NODF}) + \alpha \in_0 S/(t_{Bump}/\in_{Bump} + t_{NODF}/\in_{NODF}) \tag{3}$$

where α represents an area occupancy of the dielectric bumps 5 in the lower electrode, $t_{Bump}$ represents a film thickness of the dielectric bump layer 5, and $\in_{Bump}$ represents a relative permittivity of the dielectric bump layer 5. Since α<<1 in the present embodiment, the formula (3) can be approximated by the following formula:

$$C_{down} \approx \in_0 S/(t_{Bump} + t_{NODF}/\in_{NODF}) \tag{4}$$

The formula (4) shows that the capacitance in a down state does not depend on the hillock height $t_{Hillock}$ and can be controlled by $t_{Bump}$ and $t_{NODF}$.

FIG. 9 is a plane view illustrating an exemplary pattern of the upper electrode of the embodiment. The upper electrode 7 shown in FIG. 9 includes an opening 10.

FIGS. 10A-10D are plane views illustrating bump layouts in which the upper pattern of FIG. 9 is used. Dielectric bumps are indicated by circles.

FIGS. 10A-10D illustrate layouts in which the dielectric bumps are arranged such that the dielectric bumps exist under the periphery of the upper electrode 7.

Figure 10A:
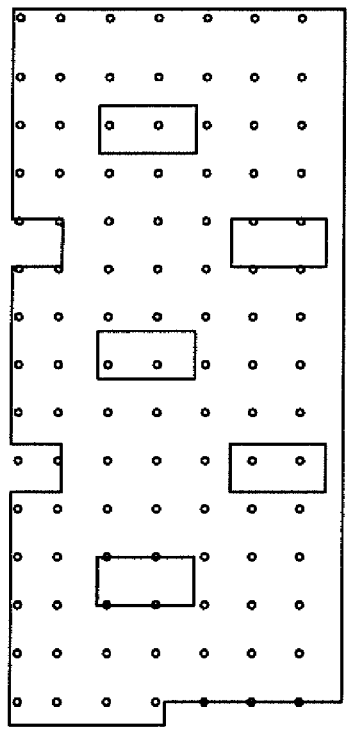
FIGS. 10A, 10B, 10C, and 10D are plane views illustrating bump layouts in a case of using the pattern of the upper pattern in FIG. 9.
Figure 10B:
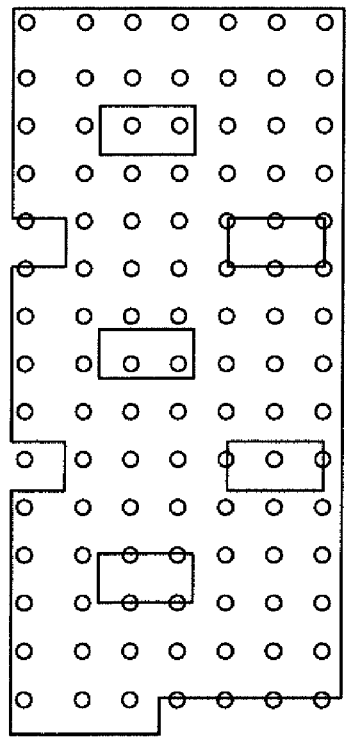
Figure 10C:
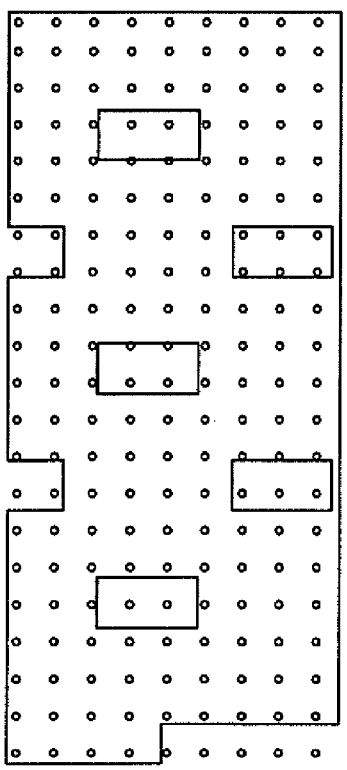
Figure 10D:
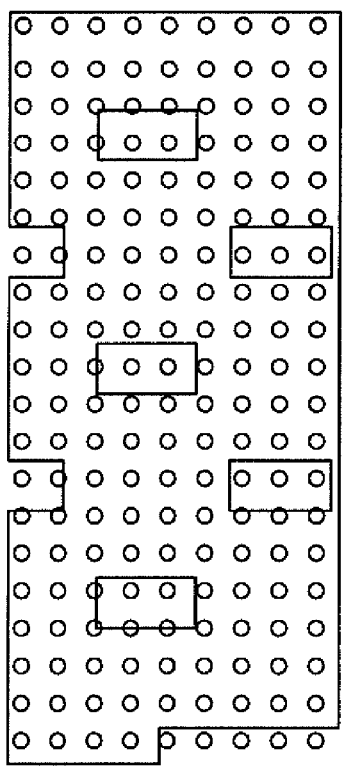
Figure 11A:
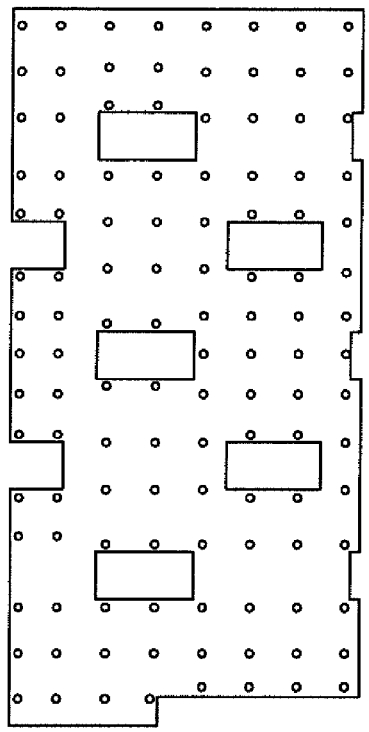
FIGS. 11A, 11B, 11C, and 11D are plane views illustrating other bump layouts in a case of using the pattern of the upper pattern in FIG. 9.
Figure 11B:
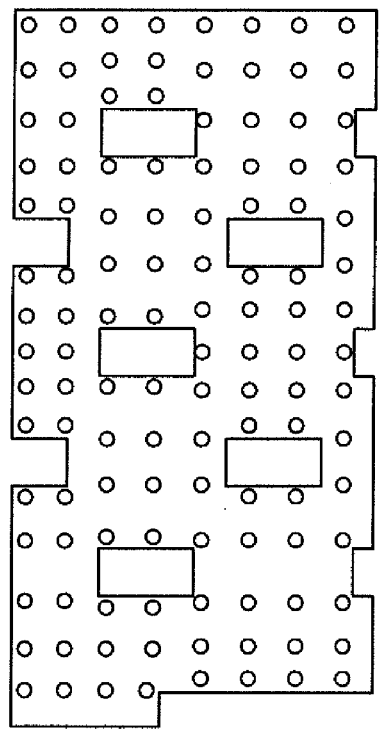
Figure 11C:
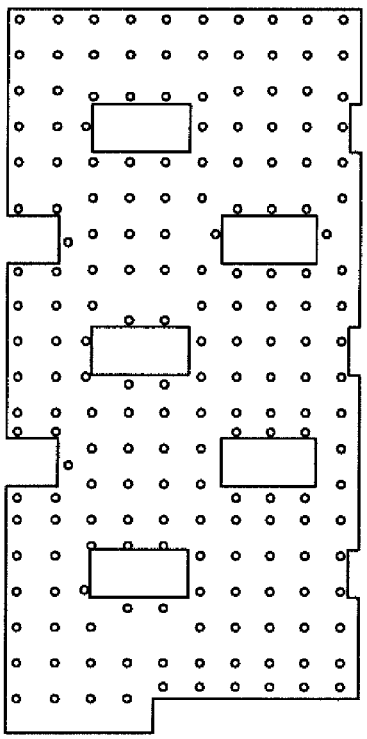
Figure 11D:
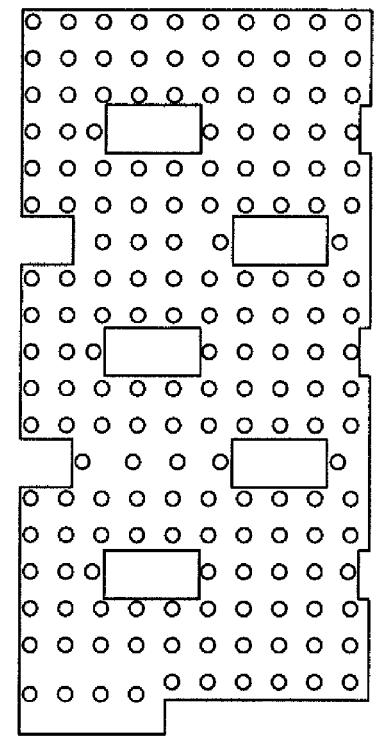

FIG. 10A illustrates a layout in which the dielectric bumps are formed in size 1.5 μm, at the pitches of 7.5 μm; FIG. 10B illustrates a layout in which the dielectric bumps are formed in size 1.5 μm, at the pitches of 10 μm; FIG. 10C illustrates a layout in which the dielectric bumps are formed in size 3 μm, at the pitches of 7.5 μm; and FIG. 10D illustrates a layout in which the dielectric bumps are formed in size 3 μm, at the pitches of 10 μm.

FIGS. 11A-11D are plane views illustrating other bump layouts in which the upper pattern of FIG. 9 is used. FIGS. 11A-11D correspond to the sizes and pitches of FIGS. 10A-10D, respectively.

FIGS. 11A-11D illustrate layouts in which the dielectric bumps are arranged such that the dielectric bumps do not exist under the opening 10 of the upper electrode 7, but exist under the edge of the opening 10 of the upper electrode and under the periphery of the upper electrode 7.

Figure 12A:
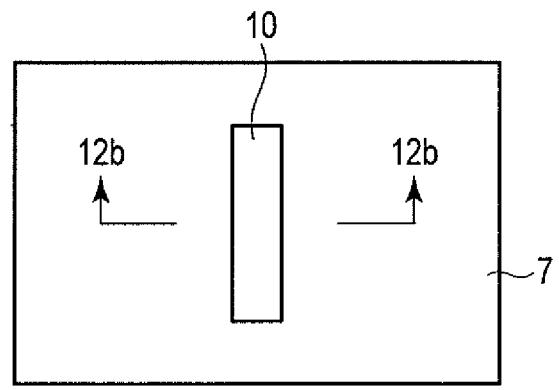
FIGS. 12A and 12B illustrate problems that occur when bumps are not arranged under an edge of an opening of an upper electrode.
Figure 12B:
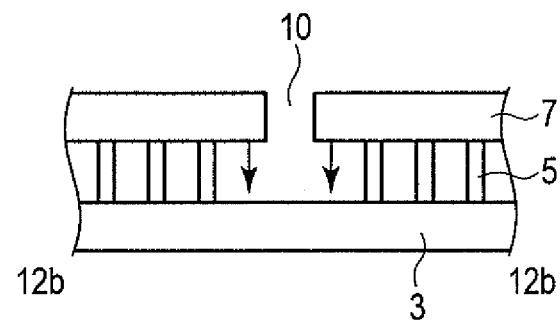

As shown in FIGS. 12A and 12B, when the dielectric bumps are not arranged under the edge of the opening 10 of the upper electrode 7, variation in capacitance increases, as the distance between the upper electrode 7 on the edge side and the lower electrode 3 decreases by an electrostatic force that acts on the upper electrode 7 on the edge side in a down state.

Thereupon, in FIGS. 11A-11D, the dielectric bumps are arranged under the edge of the opening 10 of the upper electrode to prevent increase in variation in capacitance. For the same reason, the dielectric bumps arranged under the periphery of the upper electrode 7 should preferably be not too separated from the periphery of the upper electrode 7.

Furthermore, the above described design such as the layout of the bumps and the height is an illustration, and is not to be construed as limitations thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A MEMS element comprising:
   a lower electrode having an upper surface on which a plurality of minute convex portions are formed;
   a plurality of dielectric bumps provided on the upper surface of the lower electrode and being thicker than heights of the convex portions;
   a dielectric layer provided on the dielectric bumps and the lower electrode; and
   an upper electrode provided above the dielectric layer and configured to be movable so as to vary capacitance between the upper electrode and the lower electrode.

2. The MEMS element according to claim 1, wherein material of the dielectric bumps and material of the dielectric layer are different.

3. The MEMS element according to claim 2, wherein the material of the dielectric layer has a permittivity higher than that of the material of the dielectric bumps.

4. The MEMS element according to claim 2, wherein the material of the dielectric bumps is capable of being processed at an etching rate higher than that of the material of the dielectric layer.

5. The MEMS element according to claim 2, wherein the material of the dielectric layer is a silicon nitride, and the material of the dielectric bumps is a silicon oxide.

6. The MEMS element according to claim 1, wherein the material of the dielectric bumps and the material of the dielectric layer are same.

7. The MEMS element according to claim 1, wherein the convex portions are absent under the dielectric bumps.

8. The MEMS element according to claim 1, wherein the number of the convex portions existing under the dielectric bumps is less than the number of convex portions existing between the dielectric bumps.

9. The MEMS element according to claim 1, wherein a surface of the dielectric layer on the convex portions of the lower electrode has convex shapes.

10. The MEMS element according to claim 1, wherein a plurality of minute convex portions are formed on an upper surface of the upper electrode.

11. The MEMS element according to claim 10, wherein the convex portions on the upper surface of the upper electrode are randomly formed.

12. The MEMS element according to claim 10, wherein the convex portions on the upper surface of the upper electrode include hillocks containing material of the upper electrode.

13. The MEMS element according to claim 1, wherein the dielectric bumps are arranged under a periphery of the upper electrode.

14. The MEMS element according to claim 1, wherein the upper electrode has an opening, the dielectric bumps are not arranged under the opening, and the dielectric bumps are arranged under an edge of the opening.

15. The MEMS element according to claim 1, wherein the convex portions of the lower electrode are randomly formed.

16. The MEMS element according to claim 1, wherein the convex portions of the lower electrode include hillocks containing material of the lower electrode.

17. The MEMS element according to claim 1, wherein the dielectric bumps are thicker than an average height of the convex portions of the lower electrode.

18. The MEMS element according to claim 1, wherein the dielectric bumps are thicker than maximum height of the convex portions of the lower electrode.

* * * * *